US010821844B2

(12) United States Patent
Roehrl et al.

(10) Patent No.: US 10,821,844 B2
(45) Date of Patent: Nov. 3, 2020

(54) METHOD AND DEVICE FOR DETERMINING THE ABSOLUTE POSITION OF A VEHICLE

(71) Applicant: Continental Automotive GmbH, Hannover (DE)

(72) Inventors: Thomas Roehrl, Barbing (DE); Stephan Bartz, Thumhausen (DE); Peter Saeger, Friedrichsdorf (DE)

(73) Assignee: Vitesco Technologies GmbH, Hannover (DE)

( * ) Notice: Subject to any disclaimer, the term of this patent is extended or adjusted under 35 U.S.C. 154(b) by 291 days.

(21) Appl. No.: 15/934,040

(22) Filed: Mar. 23, 2018

(65) Prior Publication Data

US 2018/0208073 A1 Jul. 26, 2018

Related U.S. Application Data

(63) Continuation of application No. PCT/EP2016/071369, filed on Sep. 9, 2016.

(51) Int. Cl.
*B60L 53/126* (2019.01)
*B60L 53/37* (2019.01)
(Continued)

(52) U.S. Cl.
CPC ............ *B60L 53/126* (2019.02); *B60L 53/12* (2019.02); *B60L 53/36* (2019.02); *B60L 53/37* (2019.02);
(Continued)

(58) Field of Classification Search
CPC .......... B60L 53/36; B60L 53/37; B60L 53/12; B60L 53/65; B60L 53/39;
(Continued)

(56) References Cited

U.S. PATENT DOCUMENTS 8,489,315 B2 * 7/2013 Yamamoto .............. B60L 53/12
701/123
9,577,466 B2 * 2/2017 Ku et al. ................. B60L 53/12
(Continued)

FOREIGN PATENT DOCUMENTS

CN 103342101 A 10/2013
CN 104423526 A 3/2015
(Continued)

OTHER PUBLICATIONS

International Search Report and Written Opinion dated Dec. 6, 2016 from corresponding International Patent Application No. PCT/EP2016/071369.
(Continued)

*Primary Examiner* — Dale W Hilgendorf

(57) ABSTRACT

A method for determining the absolute position of a vehicle for the close-range positioning of same when the vehicle is being parked is described. An inductive positioning method is performed, wherein a first transmitter in the infrastructure or in the vehicle is excited to generate a positioning magnetic field and a second transmitter in the infrastructure or in the vehicle is excited to generate a positioning signal. The positioning magnetic field and the positioning signal are received by a reception device in the vehicle or in the infrastructure and the received positioning magnetic field and positioning signal are taken as a basis for ascertaining the absolute position of the vehicle. This allows particularly exact parking of the vehicle, in particular of an electrically operated vehicle for inductive charging.

16 Claims, 3 Drawing Sheets

(51) Int. Cl.
B60L 53/65 (2019.01)
B60L 53/39 (2019.01)
B60L 53/36 (2019.01)
B60L 53/12 (2019.01)

(52) U.S. Cl.
CPC ............... B60L 53/39 (2019.02); B60L 53/65 (2019.02); *B60L 2240/627* (2013.01); *Y02T 90/125* (2013.01); *Y02T 90/128* (2013.01); *Y02T 90/162* (2013.01); *Y02T 90/163* (2013.01)

(58) Field of Classification Search
CPC ............ B60L 2240/627; Y02T 90/162; Y02T 90/163; Y02T 90/125; Y02T 90/128
See application file for complete search history.

(56) References Cited

U.S. PATENT DOCUMENTS

| | | | |
|---|---|---|---|
| 2010/0117596 A1* | 5/2010 | Cook et al. | B60L 53/60 320/108 |
| 2010/0201309 A1 | 8/2010 | Meek | |
| 2011/0254503 A1* | 10/2011 | Widmer et al. | B60L 53/12 320/108 |
| 2012/0262002 A1* | 10/2012 | Widmer et al. | B60L 53/65 307/104 |
| 2014/0015328 A1* | 1/2014 | Beaver et al. | B60L 53/12 307/104 |
| 2014/0070764 A1* | 3/2014 | Keeling | B60L 53/12 320/108 |
| 2014/0125140 A1* | 5/2014 | Widmer et al. | B60L 53/12 307/104 |
| 2015/0061897 A1 | 3/2015 | Kees et al. | |
| 2015/0073642 A1* | 3/2015 | Widmer et al. | G01C 21/36 701/22 |
| 2016/0229304 A1* | 8/2016 | Bildstein et al. | B60L 53/12 |
| 2018/0147949 A1* | 5/2018 | Heuer et al. | B60L 53/12 |

FOREIGN PATENT DOCUMENTS

| | | |
|---|---|---|
| DE | 102013016880 A1 | 7/2014 |
| DE | 102013208678 A1 | 11/2014 |
| FR | 3003815 A1 | 10/2014 |
| WO | 2012/095896 A1 | 7/2012 |
| WO | 2014/023595 A2 | 2/2014 |
| WO | 2015/038650 A1 | 3/2015 |

OTHER PUBLICATIONS

Office Action dated Aug. 10, 2016 from corresponding German Patent Application No. 10 2015 218 410.2.

\* cited by examiner

METHOD AND DEVICE FOR DETERMINING THE ABSOLUTE POSITION OF A VEHICLE

CROSS-REFERENCE TO RELATED APPLICATIONS

This application claims the benefit of PCT Application PCT/EP2016/071369, filed Sep. 9, 2016, which claims priority to German Patent Application 10 2015 2018 410.2, filed Sep. 24, 2015. The disclosures of the above applications are incorporated herein by reference.

FIELD OF THE INVENTION

The present invention relates to a method for determining the absolute position of a vehicle for the close-range positioning of same when the vehicle is being parked. The invention is further directed at a device for performing such a method.

In this context, "parking" means automatic parking but also manual parking, for example assisted by a visual display.

BACKGROUND OF THE INVENTION

Automatic parking of vehicles is known. This may be the parking of a vehicle in a marked parking space or parking in a garage, for example. A specific case relates to the inductive charging of electrically operated vehicles, which, to this end, need to visit an appropriate parking space that provides such a charging option (for example there is a transmission coil in the ground for this). In particular, precise arrangement of the vehicle is of essential importance in this case, since a strong magnetic field dependent on the electrical power is set up between the unit for inductively charging (the ground coil) and the reception unit arranged in the vehicle (vehicle coil). Safety is served in this case if the magnetic field is generated beneath the vehicle, so as to be barely accessible to human beings. Moreover, this means that the vehicle itself provides a shielding effect, which means that radiation of the fields into the surroundings is significantly minimized.

However, this advantage entails the disadvantage that the driver may barely assess whether exact positioning between the two coils has occurred beneath the vehicle. This is because the less the two coils are in alignment with one another, that is to say the less they are precisely above one another, the poorer the power transfer. The coupling factor drops and the efficiency decreases while the undesirable stray fields increase.

Depending on the coil design, the efficiency already decreases by 2% for an offset of only 8 cm, for example. 2% of a transfer power of 4 kW, for example, is, after all, already 80 W of additional power loss.

The driver thus has to park with a precision of a few centimetres without visual contact, which, without aids, may be guaranteed only with difficulty. Besides the option of assisting the driver with a visual display, an automated parking process is naturally also conceivable.

The present invention relates to a parking process, in particular an automated parking process, parking for inductively charging the vehicle being a special case in this context.

To perform an automated parking process, concepts have been developed that use camera image recognition systems, radio locating, radar, ultrasound or else RFID. These concepts have also been combined with one another. The applicable approaches to a solution have disadvantages, however. By way of example, the surroundings of every parking space are different. If every parking space has a different appearance, however, to what are the locating systems supposed to orient themselves if a standard identification mark has not been agreed? These systems without standardization therefore work only for particular instances of application and a single surroundings situation. Moreover, optical systems (cameras) have the disadvantage that the parking space changes its appearance depending on the weather and season, contrasts and colour saturation change in the event of brightness and rain, and because leaves in the fall at least partially conceal the parking space identification, which may have a coloured presence. In winter when there is snow, this problem exists fundamentally.

US 2012/0262002 A1 discloses an inductive positioning system. This method involves the ground coil of a charging station having a weak magnetic field applied to it, which is an applicable positioning field. On the basis of the strength and/or direction of this magnetic field, the provided system may thus compute the position of the charging coil. Consequently, a vehicle equipped with an inductive positioning system of this kind is capable of locating the ground coil in virtually any desired parking space in any weather.

If such a vehicle is now parked automatically, however, the problem arises that parking positions that cannot be distinguished from one another exist. In this regard, reference is made to FIG. 1. This figure schematically shows a parking space from above. The magnetic method described above allows the vehicle to determine the x and y offsets of the ground coil in relation to the vehicle itself. In this case, however, positions 1-3 shown in the figure all deliver the same result. Naturally, the bearing of the parking space may also be captured by means of a camera system, but this method would again result in a dependency on weather conditions, such as snow and leaves.

SUMMARY

The present invention is therefore based on the object of providing a method of the type described that allows particularly exact parking of the vehicle.

This object is achieved according to the invention by a method of the type described at the outset, in which an inductive positioning method is performed, wherein a first transmitter in the infrastructure or in the vehicle is excited to generate a positioning magnetic field and a second transmitter in the infrastructure or in the vehicle is excited to generate a positioning signal.

the positioning magnetic field and the positioning signal are received by a reception device in the vehicle or in the infrastructure, and the received positioning magnetic field and positioning signal are taken as a basis for ascertaining the absolute position of the vehicle.

In the description that follows, it is assumed that the reception device is in the vehicle and the transmitters are in the infrastructure, i.e. in the surroundings of the vehicle. If the text below refers to a parking bay or a parking space, these terms are supposed to cover all possible parking spots, including roofed parking spots or garages and those provided with charging devices.

To be able to ascertain the alignment of the parking space in addition to the position of the first transmitter, the vehicle requires a further point of reference that is in the infrastructure. In the case of the method described here, in which a positioning field is measured by the first transmitter, such a point is a second transmitter in the infrastructure. This allows not only the x and y offsets of the vehicle relative to the first transmitter to be determined, but moreover also the x and y offsets of the second transmitter in relation to the coordinate system of the vehicle.

The method according to the invention therefore involves a second transmitter or auxiliary transmitter being used. While, as described above, positions 1-3 cannot be distinguished from one another without a second transmitter, the second transmitter may be used to clearly distinguish the individual positions from one another. The reason is that two points in the infrastructure are now known and therefore the relative coordinate system of the vehicle may be transferred to the absolute coordinate system of the infrastructure. Other than the advantage of knowing precisely where the vehicle is in the infrastructure, the complexity of the system also increases, however, since both a positioning magnetic field and a positioning signal need to be transmitted and evaluated.

Preferably, a second transmitter is used that likewise generates a positioning magnetic field. Two positioning magnetic fields are therefore used. In this context, the two fields may overlap, which means that the result is a field that has a more complex form than the single fields had. Depending on the distance at and the direction in which the second transmitter is arranged in relation to the first transmitter, the influence of the second transmitter on the positioning field is different.

In one embodiment of the method according to the invention, the position of the second transmitter in relation to the first transmitter is standardized. Standardization of the position of the second transmitter relative to the first transmitter allows the disadvantages outlined above to be avoided, but the algorithm for computing the position would end up being significantly more complex. The solution algorithm would therefore need to be matched to this complex form.

Further options for implementing the method described above are described below. In this context, first the position of the second transmitter in relation to the first transmitter is ascertained. If this position is known, the position of the vehicle in the infrastructure may be computed from the computed distances between vehicle and transmitters. As such, the position of the second transmitter may be ascertained via a different channel, in particular Wireless Local Area Newtowrk (WLAM), for example. This variant has the advantage that the second transmitter is matched to local circumstances.

The first transmitter and the second transmitter are preferably excited sequentially. This allows the x and y offsets of the individual transmitters to the captured separately. The algorithm used to compute the position may then end up being much simpler and faster on account of the simpler and more symmetrical geometry of the single fields. To distinguish from which transmitter the currently radiated field is emitted, a further communication channel, for example WLAN, is used between transmitter and vehicle.

It is also possible for the two transmitters to be distinguished from one another by virtue of an identifier being modulated onto a position signal, for example a coil identifier.

Besides the sequential transmission process, it is naturally also possible for different frequencies to be used for the two transmitters. This allows the reception device to distinguish between the two transmitters. Given suitable filtering (e.g. resonant circuits) of the single fields, it is therefore possible for simple locating of the vehicle in the infrastructure to take place.

The method according to the invention is preferably employed for the close-range positioning of an electrically operated vehicle for inductive charging. Such a method has already been explained adequately above. This method variant involves the unit for inductively charging the vehicle, which unit is used as the first transmitter in this case, being used to generate a positioning magnetic field in addition to the magnetic field radiated during the charging process. The positioning magnetic field is therefore used for exactly positioning the vehicle in order to align the unit for inductive charging, which is preferably inset as a ground coil in the ground of the parking space, exactly in relation to the reception device arranged in the vehicle.

Such a method is described in the aforementioned US 2012/0262002 A1. According to the invention, a method of this kind is extended in this specific embodiment by the arrangement of a second transmitter, as explained above.

While the text above referred to individual parking spaces or parking spots, the method according to the invention also relates to a case in which multiple parking spaces or parking spots are arranged next to one another. In this context, every parking space is provided with a first transmitter for emitting a positioning magnetic field, and has a second transmitter that may have the embodiments described above and may deliver a corresponding positioning signal, which may likewise be a positioning magnetic field, but may also be other signals. In this embodiment too, the first transmitters may be units for inductively charging that are preferably operated by a central charging station.

Specifically, by way of example, multiple inductive charging spaces are therefore arranged next to one another in this context. In order to coordinate the charging of the individual vehicles and to allocate the applicable parking spaces to newly arriving vehicles, the applicable charging units (ground coils) are best operated by a central charging station. If a vehicle now wishes to take up a completely vacant inductive charging space, the vehicle sends an enquiry via WLAN to the charging station, for example. Since there is currently no vehicle in a charging space, the vehicle is allocated the first ground coil. Since there is a further ground coil in the neighboring space in this case, this further ground coil (adjacent unit for inductive charging) may be used as the second transmitter. In this context, it is therefore possible to dispense with a specific auxiliary transmitter.

If the respective adjacent inductive charging spaces are already occupied, however, the units thereof for inductively charging (ground coils) are no longer able to be used as an auxiliary transmitter. In this case, a different system therefore needs to be used, for example an optical system, that acts as a second transmitter. If, by way of example, a vehicle heads for a middle parking bay, with a vehicle already on both the right and left, these two vehicles may serve as a visual identification feature, so that the vehicle is parked automatically even if parking space boundaries are not visible.

As already mentioned, it is not absolutely necessary to use a unit for inductively charging, specifically a ground coil, as the first transmitter (positioning transmitter). What is essential for the method according to the invention is that a first transmitter is used to perform an inductive positioning method, specifically regardless of whether or not the first transmitter in this case is a charging unit. The second transmitter may be any transmitter that delivers a positioning signal, for example an optical transmitter, with a transmitter on an inductive basis being preferred in this case too.

It goes without saying that further transmitters may also be used for the method according to the invention.

In the case of the specific embodiments described above, it has been assumed that the transmitters are in the infrastructure and a corresponding reception device is provided in the vehicle. Preferably, the reception devices used in this case for determining the x and y offsets are at least three transmitters. Therefore, the positions of the transmitters may be triangulated.

According to the invention, it is naturally equally possible to arrange applicable transmitters, preferably three or more, in the vehicle and to replace the second transmitter in the infrastructure (one or more auxiliary transmitter(s)) with auxiliary receivers. As such, it is possible, by way of example, to use the transmission coils of a PASE® system to generate multiple search fields, for example sequentially. The receivers in the infrastructure may subsequently triangulate the x and y offsets of the vehicle in relation to the transmitter and, by way of example, use a further channel (e.g. radio, WLAN) to return them to the vehicle. If the values from at least two receivers in the infrastructure are known, the position of the vehicle in the infrastructure may be computed.

The method according to the invention may also be combined with further methods. By way of example, cameras or top-view systems that are present may be integrated, as may fully automatic parking aids and/or wheel speed sensors, GPS/Galileo, etc., GOOGLE STREET VIEW®, known WLAN nodes, etc.

A variant is also possible in which the ground coil and the geographical bearing of the associated parking space have been surveyed. When a vehicle approaches, it orients itself to the magnetic fields, but likewise has the geographical orientation of the parking space communicated to it by coding or WLAN info. If the parking space is defined in a north-south direction, for example, then the vehicle may use its GPS and compass orientation to correctly drive to the parking space precisely.

According to the invention, a positioning system is therefore provided that allows the vehicle to be positioned in relation to the infrastructure. As a result, automatic parking is implemented for inductive charging processes or other parking processes without expecting limitations for conventional sensor functions (snow, leaves, etc.).

The invention further relates to a device for performing the method described above.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention is explained in detail below with reference to an exemplary embodiment in connection with the drawing, in which.

DETAILED DESCRIPTION OF THE PREFERRED EMBODIMENT

The following description of the preferred embodiment(s) is merely exemplary in nature and is in no way intended to limit the invention, its application, or uses.

Figure 1:
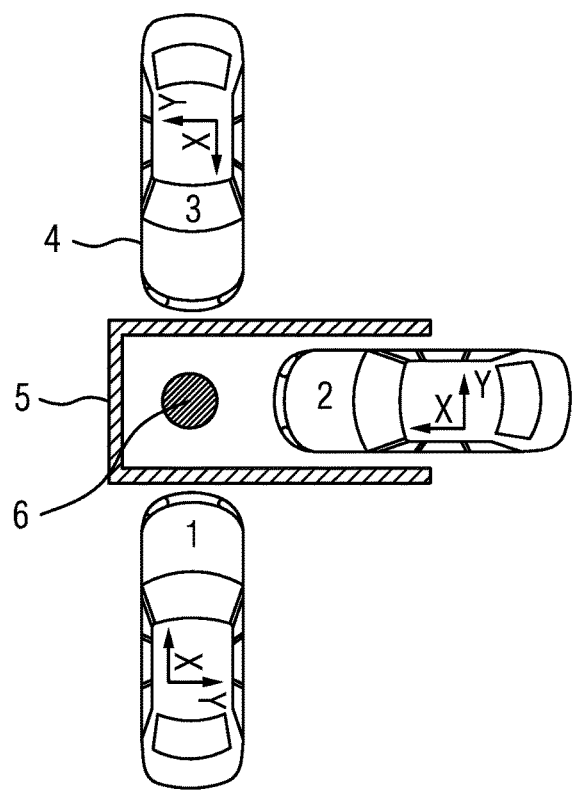
FIG. 1 shows a depiction of a parking space from above for a method of the prior art with undistinguishable parking positions.

The method of the prior art shown in FIG. 1 involves determination of the absolute position of a vehicle taking place for close-range positioning of same when the vehicle is being automatically parked. An inductive positioning method is performed, wherein a ground coil 6 (first transmitter) inset in the ground of a parking space 5 is excited to generate a positioning magnetic field. This magnetic field is received by a reception device arranged in a vehicle 4. The received positioning magnetic field is taken as a basis for ascertaining the position of the vehicle.

The magnetic method described above allows the vehicle 4 to determine the x and y offsets of the ground coil 6 in relation to the vehicle 4 itself. In this case, however, positions 1-3 of the vehicle that are shown in FIG. 1 all deliver the same result. The correct position of the vehicle 4 exactly over the ground coil 6 cannot be ascertained therefore.

Figure 2:
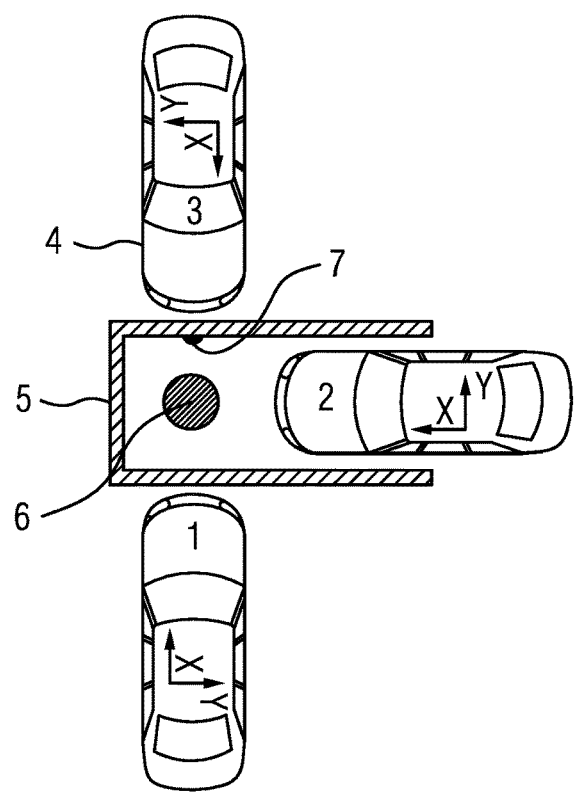
FIG. 2 shows a schematic view as in FIG. 1 for an embodiment of the method according to the invention.

FIG. 2 shows the same parking situation as in FIG. 1, but with an embodiment of the method according to the invention being performed in this case. In this context, the inductive positioning method involves not only the ground coil 6 inset in the ground of the parking space 5 being used but also a second transmitter (auxiliary transmitter) 7, which is arranged at the edge of the parking space 5, for example. In this case too, the ground coil 6 used for charging the vehicle 4 is used before charging as an inductive positioning transmitter that generates a positioning magnetic field. The second transmitter 7 also generates a positioning magnetic field. The two positioning magnetic fields are received by a reception device in the vehicle 4, and the received positioning magnetic fields are taken as a basis for ascertaining the absolute position of the vehicle.

While positions 1-3 cannot be distinguished from one another without a second transmitter 7 (auxiliary transmitter), the second transmitter 7 is used to clearly distinguish the individual positions from one another. The reason is that two points in the infrastructure are now known and therefore the relative coordinate system of the vehicle 4 is transferred to the absolute coordinate system of the infrastructure.

Figure 3:
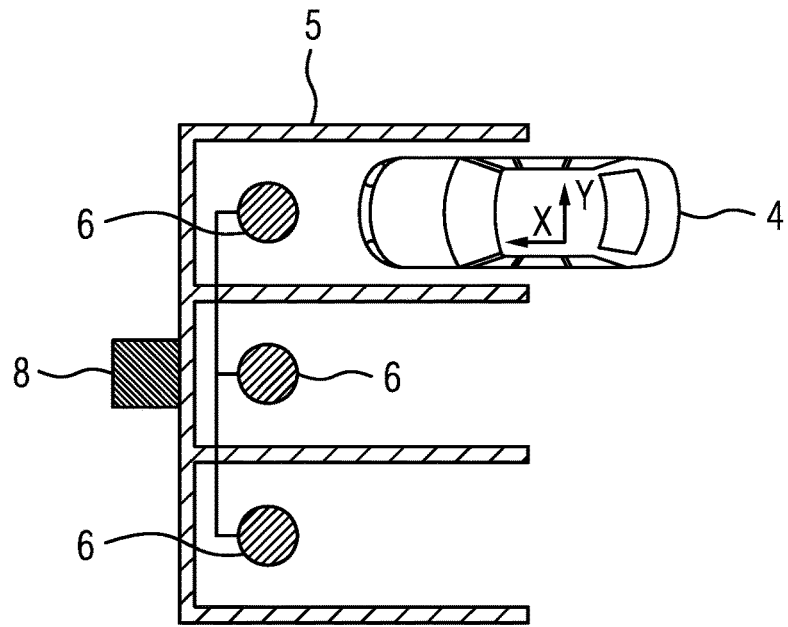
FIG. 3 shows a schematic view of a parking space from above with three parking bays for another embodiment of the method according to the invention.

FIG. 3 shows a plan view of a parking area with three parking bays or parking spaces 5. The ground of each parking space 5 has a ground coil 6 inset in it. All three ground coils 6 are supplied with power by a common charging station 8.

In the situation depicted here, in which a vehicle 4 moves into the upper parking bay in the figure, the two lower parking bays are vacant. In this case, the ground coil 6 of the middle parking bay serves as a second transmitter or auxiliary transmitter.

If the vehicle 4 wishes to charge at the completely vacant deep-charging space, it sends an enquiry, for example via WLAN, to the charging station 8. Since there are currently no vehicles at all in a charging space, the vehicle is allocated the ground coil 6 of the topmost parking bay. The ground coil 6 in the middle parking bay acts as a second transmitter or auxiliary transmitter in this case.

Figure 4:
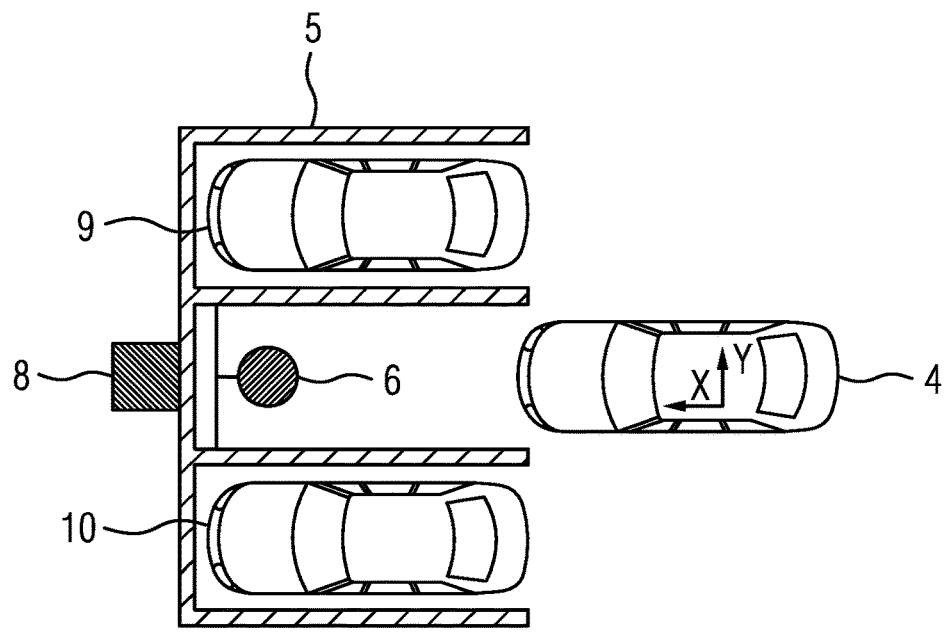
FIG. 4 shows a schematic view of a parking space from above with three parking bays for yet another embodiment of the method according to the invention.

In the parking situation schematically depicted in FIG. 4, there are likewise three parking bays 5, each parking bay 5 having a ground coil 6. All the ground coils 6 are supplied with power by a common charging station 8. The situation depicted here differs from that of FIG. 3 in that the upper and lower parking bays in the figure are already occupied. The applicable ground coils 6 of these parking bays are therefore no longer able to be used as an auxiliary transmitter. The vehicle 4 may therefore now only be parked in the middle parking bay. Since there is already a vehicle on both sides of the middle parking bay as a visual identification feature, the vehicle 4 may also be parked automatically in this case using an optical system.

Figure 5:
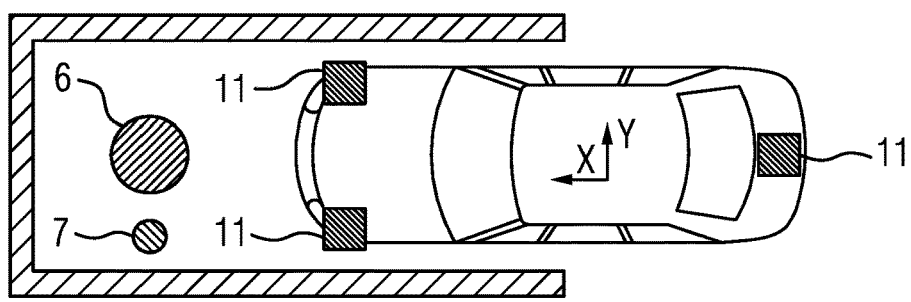
FIG. 5 shows a schematic view of parking spaces from above, various embodiments of the invention being depicted.
Figure 5:
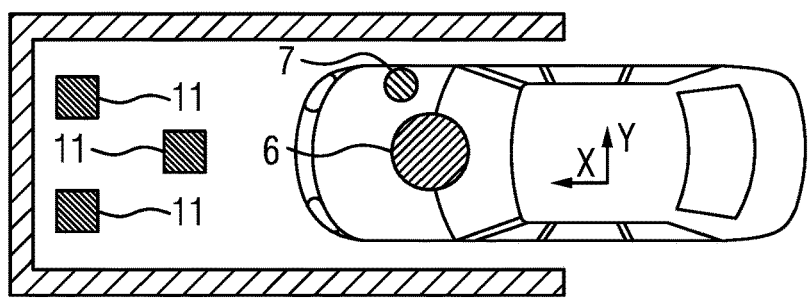
Figure 5:
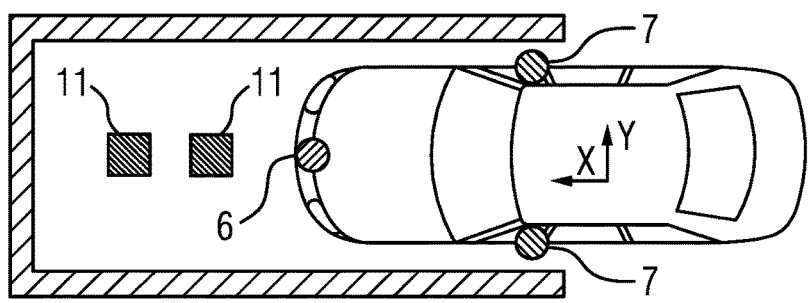
Figure 5:
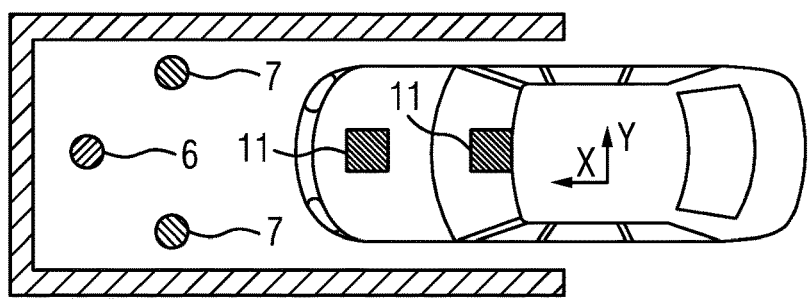

FIG. 5 shows a schematic view of various parking spaces from above, various embodiments of the invention being depicted. In the embodiment of FIG. 5 A), a first transmitter in the form of a ground coil 6 and a second transmitter 7 are provided in the infrastructure (in the area of the parking space). The associated vehicle has a reception device, which in this case has three receivers 11.

In the embodiment shown in FIG. 5 B), a first transmitter 6 and a second transmitter 7 are provided on the vehicle, while there are three receivers 11 in the parking space area (in the infrastructure).

The embodiment of FIG. 5 C) shows a first transmitter 6 and two second transmitters 7 on the vehicle and two receivers 11 in the parking space area (infrastructure).

Finally, the embodiment of FIG. 5 D) shows a first transmitter as a ground coil 6 and two second transmitters 7 arranged in the parking space area, and also two receivers 11 arranged on the vehicle.

If the receivers are outside the vehicle, they need to return their data to the vehicle so that the vehicle knows the position.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for determining an absolute position of a vehicle for close-range positioning of same when the vehicle is being parked, comprising:
   providing a first transmitter as part of infrastructure;
   providing a second transmitter as part of the infrastructure;
   providing a reception device as part of the vehicle;
   generating a positioning magnetic field by exciting the first transmitter;
   generating a positioning signal by exciting the second transmitter;
   detecting the positioning signal and the positioning magnetic field using the reception device;
   using the positioning magnetic field and the positioning signal as a basis for ascertaining the absolute position of the vehicle; and
   wherein the first transmitter and the second transmitter are both located as part of the infrastructure for charging one vehicle.

2. The method of claim 1, further comprising generating a positioning magnetic field using the second transmitter.

3. The method of claim 2, further comprising standardizing position of the second transmitter in relation to the first transmitter.

4. The method of claim 2, further comprising determining position of the second transmitter in relation to the first transmitter.

5. The method of claim 4, further comprising transmitting the position of the second transmitter via a different channel.

6. The method of claim 5, further comprising providing the channel to be a wireless local area network.

7. The method of claim 1, further comprising exciting the first transmitter and the second transmitter sequentially.

8. The method of claim 1, further comprising:
   providing at least one identifier;
   distinguishing the first transmitter and the second transmitter from one another by virtue of the identifier being modulated onto the positioning signal.

9. The method of claim 1, further comprising using different transmission frequencies for the first transmitter and the second transmitter.

10. The method of claim 1, further comprising:
    providing the vehicle to be an electrically operated vehicle;
    determining the absolute position of the electrically operated vehicle for the close-range positioning of the electrically operated vehicle for inductive charging.

11. The method of claim 10, further comprising providing the first transmitter to be a unit for inductively charging the vehicle.

12. The method as claimed in claim 11, further comprising providing the unit employed for inductively charging to be a ground coil.

13. The method of claim 12, further comprising:
    providing a central charging station;
    providing a plurality of ground coils located adjacent to one another;
    operating the ground coils using the central charging station.

14. The method as claimed in claim 13, further using one of the plurality of ground coils as the second transmitter.

15. The method of claim 1, further comprising:
    providing an optical system;
    using the optical system as the second transmitter.

16. A device for determining an absolute position of a vehicle for close-range positioning of same when the vehicle is being parked, comprising:
    a first transmitter being part of infrastructure, the first transmitter operable for generating a positioning magnetic field;
    a second transmitter being part of the infrastructure, the second transmitter operable for generating a positioning signal;
    a reception device as part of one of the infrastructure or the vehicle, the reception device operable for detecting the positioning signal and the positioning magnetic field;
    wherein the positioning magnetic field and the positioning signal are used as a basis for ascertaining the absolute position of the vehicle; and
    wherein the first transmitter and the second transmitter are both located as part of the infrastructure for charging one vehicle.

* * * * *